(12) United States Patent
Li

(10) Patent No.: US 12,236,843 B2
(45) Date of Patent: Feb. 25, 2025

(54) DISPLAY CONTROL METHOD, APPARATUS, DEVICE, MEDIUM AND PRODUCT

(71) Applicant: Beijing Zitiao Network Technology Co., Ltd., Beijing (CN)

(72) Inventor: Rentao Li, Beijing (CN)

(73) Assignee: Beijing Zitiao Network Technology Co., Ltd., Beijing (CN)

( * ) Notice: Subject to any disclaimer, the term of this patent is extended or adjusted under 35 U.S.C. 154(b) by 0 days.

(21) Appl. No.: 18/329,324

(22) Filed: Jun. 5, 2023

(65) Prior Publication Data

US 2023/0419879 A1    Dec. 28, 2023

(30) Foreign Application Priority Data

Jun. 22, 2022 (CN) .......................... 202210716494.8

(51) Int. Cl.
*G09G 3/20* (2006.01)
(52) U.S. Cl.
CPC ... *G09G 3/2096* (2013.01); *G09G 2320/0233* (2013.01); *G09G 2320/0626* (2013.01); *G09G 2320/066* (2013.01); *G09G 2320/0666* (2013.01); *G09G 2340/0435* (2013.01)
(58) Field of Classification Search
CPC ................................. G06F 3/0446; G09G 3/20
USPC ....................................................... 345/1.3
See application file for complete search history.

(56) References Cited

U.S. PATENT DOCUMENTS

| 2019/0285895 | A1* | 9/2019 | Fujimaki | .............. | H04N 13/332 |
| 2021/0084287 | A1* | 3/2021 | Keesling | .............. | H04N 13/122 |

FOREIGN PATENT DOCUMENTS

| CN | 108334299 A | 7/2018 |
| CN | 111343321 B | 8/2021 |

* cited by examiner

*Primary Examiner* — Calvin C Ma

(57) ABSTRACT

Embodiments of the present disclosure disclose a display control method and apparatus, a device, a medium and a product. The method is applied to a head-mounted device and includes a first screen and a second screen. The method includes: determining a parameter mapping relationship corresponding to a target display parameter of the first screen and the second screen; obtaining a target parameter value set for the target display parameter; determining, based on the target parameter value and the parameter mapping relationship, a first parameter value corresponding to the first screen and a second parameter value corresponding to the second screen; and setting the target display parameter of the first screen as the first parameter value, and setting the target display parameter of the second screen as the second parameter value. The present disclosure solves the problem of inconsistent display settings for the head-mounted device.

20 Claims, 5 Drawing Sheets

DISPLAY CONTROL METHOD, APPARATUS, DEVICE, MEDIUM AND PRODUCT

CROSS-REFERENCE TO RELATED APPLICATION

This application claims priority to Chinese Patent Application No. 202210716494.8, filed on Jun. 22, 2022, which is hereby incorporated by reference in its entirety.

TECHNICAL FIELD

Embodiments of the present disclosure relate to the field of computer technologies, and in particular, to a display control method and apparatus, a device, a medium, and a product.

BACKGROUND

With the rapid development of technology, the types of terminal devices become increasingly diverse, and two or more screens may be used in a variety of terminal devices, for example, a plurality of screens are typically configured in terminal devices such as a virtual reality (VR) device, a foldable phone, and a large display screen. In order to ensure consistency of screens of a terminal device, for example, consistent brightness and consistent color, it is generally necessary to set screen parameters of a plurality of screens in the terminal device in a unified manner. For example, when brightness is taken as a screen parameter, the brightness of all screens can be set as the same value, especially in extended reality devices, the design in which two eyes respectively correspond to an individual screen is often used. In this design, in order to obtain a more comfortable display effect, it is necessary to maintain consistency in the actual display of the screens of the left and right eyes. However, in practical applications, due to an error of a product itself, even for screens of exactly the same model, when the display parameters are set to the same value, the display effect obtained cannot be ensured to be completely consistent. For example, when the brightness of two screens is set to 100, there will be a phenomenon of one high brightness and one low brightness.

SUMMARY

Embodiments of the present disclosure provide a display control method and apparatus, a device, a medium, and a product.

In a first aspect, an embodiment of the present disclosure provides a display control method, applied to a head-mounted device including a first screen and a second screen, where the method includes:

determining a parameter mapping relationship corresponding to a target display parameter of the first screen and the second screen;

obtaining a target parameter value set for the target display parameter;

determining, based on the target parameter value and the parameter mapping relationship, a first parameter value corresponding to the first screen and a second parameter value corresponding to the second screen; and setting the target display parameter of the first screen as the first parameter value, and setting the target display parameter of the second screen as the second parameter value.

In a second aspect, an embodiment of the present disclosure provides a display control apparatus, disposed on a head-mounted device including a first screen and a second screen, where the apparatus includes:

a parameter mapping unit, configured to determine a parameter mapping relationship corresponding to a target display parameter of the first screen and the second screen;

a target obtaining unit, configured to obtain a target parameter value set for the target display parameter;

a parameter adjusting unit, configured to determine, based on the target parameter value and the parameter mapping relationship, a first parameter value corresponding to the first screen and a second parameter value corresponding to the second screen; and a display setting unit, configured to set the target display parameter of the first screen as the first parameter value, and set the target display parameter of the second screen as the second parameter value.

In a third aspect, an embodiment of the present disclosure provides a head-mounted device, including: a processor, a memory, a first screen, and a second screen; where there are circuit interconnections among the processor, the memory, the first screen, and the second screen;

the memory is configured to store computer execution instructions; and the processor executes the computer execution instructions stored in the memory to cause the processor to be configured to:

determine a parameter mapping relationship corresponding to a target display parameter of the first screen and the second screen;

obtain a target parameter value set for the target display parameter;

determine, based on the target parameter value and the parameter mapping relationship, a first parameter value corresponding to the first screen and a second parameter value corresponding to the second screen; and set the target display parameter of the first screen as the first parameter value, and set the target display parameter of the second screen as the second parameter value.

In a fourth aspect, an embodiment of the present disclosure provides a computer readable storage medium, where the computer readable storage medium stores therein computer execution instructions, a processor, when executing by a processor, implement the display control method according to the first aspect and various possible designs of the first aspect.

In a fifth aspect, an embodiment of the present disclosure provides a computer program product including a computer program, where the computer program, when executed by a processor, causes the display control method according to the first aspect and various possible designs of the first aspect to be implemented.

The head-mounted device of this embodiment can include a first screen and a second screen. By determining a parameter mapping relationship corresponding to a target display parameter of the first screen and the second screen, parameter analysis between two or more screens can be performed. Furthermore, after obtaining a target parameter value set for the target display parameter, a first parameter value corresponding to the first screen and a second parameter value corresponding to the second screen can be determined based on the target parameter value and the parameter mapping relationship, thereby setting the target display parameter of the first screen as the first parameter value and setting the target display parameter of the second screen as the second parameter value. By means of the parameter mapping relationship between screens, accurate parameter setting can be performed between a plurality of screens, thereby achieving accurate parameter settings for different screens by using the target parameter value, and improving accuracy and efficiency of display parameter setting.

BRIEF DESCRIPTION OF DRAWINGS

In order to describe technical solutions in embodiments of the present disclosure or the existing technology more clearly, the accompanying drawings used in the description of the embodiments of the present disclosure or the existing technology will be briefly described hereunder. Apparently, the drawings in the following description are intended for some embodiments of present disclosure. For persons of ordinary skill in the art, other drawings may be obtained based on these drawings without any creative effort.

DESCRIPTION OF EMBODIMENTS

Figure 1:
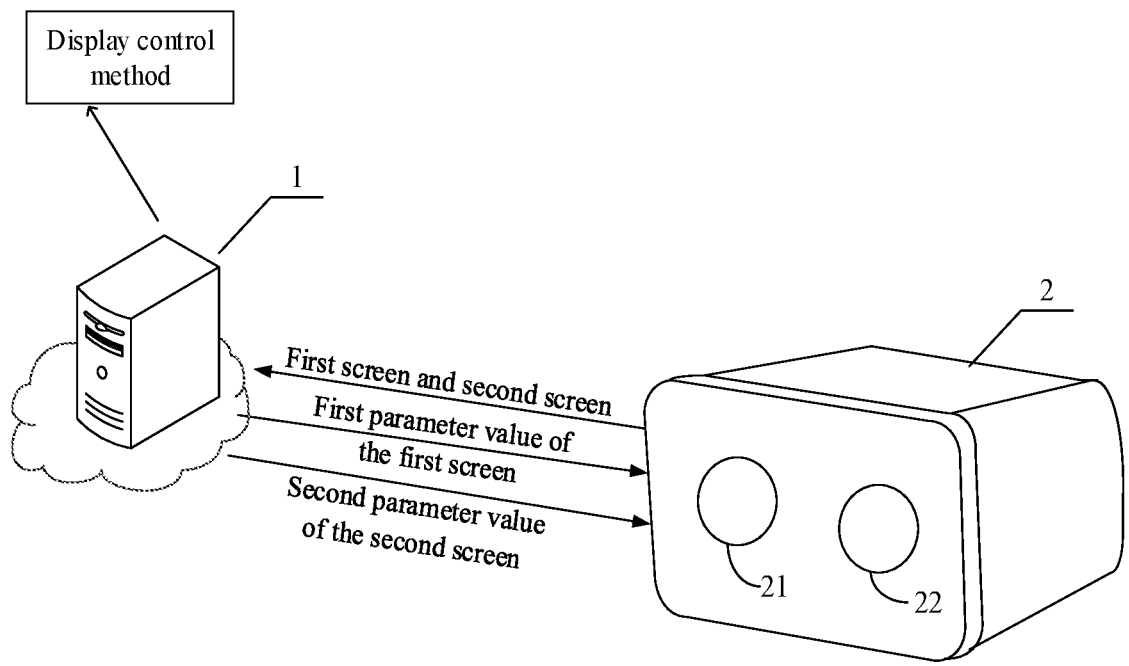
FIG. 1 is a diagram of an application network architecture of a display control method provided by an embodiment of the present disclosure.

In order to make objectives, technical solutions, and advantages of embodiments of the present disclosure clearer, the technical solutions in the embodiments of the present disclosure will be described hereunder clearly and comprehensively with reference to the accompanying drawings in the embodiments of the present disclosure. Apparently, the described embodiments are only some embodiments of the present disclosure, rather than all embodiments of the present disclosure. All other embodiments obtained by persons of ordinary skill in the art based on the embodiments of the present disclosure without any creative effort shall fall into the protection scope of the present disclosure.

The technical solution of the present disclosure can be applied to a dual-screen display control scene of a VR technology. By obtaining a parameter mapping relationship between two screens, screens with different display scenes are controlled, thereby improving the display efficiency of the screens.

In related arts, in order to improve a display clarity of a terminal device, a plurality of screens can be set in the device, for example, generally two screens can be set. In order to ensure that the plurality of screens have the same display effect, it is generally required to set the plurality of screens to have the same display parameter value. Especially in extended display devices, the design in which two eyes respectively correspond to an individual screen is often used. In this design, in order to obtain a more comfortable display effect, it is necessary to maintain consistency in the display of the screens of the left and right eyes. For example, brightness of two screens in a VR device is set to 100, so that the brightness of the two screens is displayed as 100. However, in practical applications, due to an error of a product itself, even if screens of completely the same model are used, when a plurality of screens are set to have the same display parameter value, a display effect obtained by the plurality of screens cannot be ensured to be completely consistent.

In order to solve the described technical problem, it has been found through research that, due to limitations of reasons such as process and hardware, the control results of display parameters of different screens are different. Taking brightness as an example, if two screens are set to have brightness values of 100, when the setting ends, actual brightness of one of the two screens may be 98, and that of the other is 103, which results in inconsistent brightness settings of the two screens. When analyzing screens, by analyzing display data of the screens having the same display parameter, a mapping relationship between display parameters of the screens can be obtained, and actual adjustment of the parameters is performed by means of the mapping relationship corresponding to the display parameters of the screens, so as to ensure that two or more screens can obtain the same display effect.

In embodiments of the present disclosure, the head-mounted device can include a first screen and a second screen. By determining a parameter mapping relationship corresponding to a target display parameter of the first screen and the second screen, the parameter analysis between two or more screens can be implemented. Furthermore, after obtaining a target parameter value set for the target display parameter, a first parameter value corresponding to the first screen and a second parameter value corresponding to the second screen can be determined based on the target parameter value and parameter mapping relationship, thereby achieving setting the target display parameter of the first screen as the first parameter value and setting the target display parameter of the second screen as the second parameter value. By means of the parameter mapping relationship between screens, accurate parameter setting can be performed between a plurality of screens, thereby achieving accurate parameter settings for different screens by using a target parameter value, and improving the accuracy and efficiency of display parameter settings.

The technical solution of the present disclosure and how does the technical solution of the present disclosure solve the above technical problem will be described in detail below with reference to specific embodiments. Several particular embodiments may be combined with each other, and the same or similar concepts or processes may not be repeated in certain embodiments. Hereinafter, embodiments of the present disclosure will be described in detail with reference to the drawings.

FIG. 1 is a diagram of an application network architecture of a display control method according to the present disclosure. The application network architecture according to the embodiment of the present disclosure may include a head-mounted device and a terminal device connected to the head-mounted device through a local area network or a wide area network. It is assumed that the head-mounted device may be a personal computer, a normal server, a super personal computer, a cloud server, and other types of servers, and the present disclosure does not make too many limitations on the specific type of the head-mounted device. The terminal device may be, for example, a mobile phone, a tablet computer, a personal computer, an intelligent appliance, a wearable device, etc., and the present disclosure does not make too many limitations on the specific type of the terminal device. As shown in FIG. 1, taking a terminal device as a cloud server 1, two screens 21 and 22 may be configured in a head-mounted device 2, respectively, and the cloud server 1 may determine a screen of any head-mounted device 2, including a first screen and a second screen. Based on the technical solution of the present disclosure, the cloud server 1 can set parameters for the first screen and the second screen to achieve consistent display effects for two or more screens and improve the accuracy of parameter settings.

Figure 2:
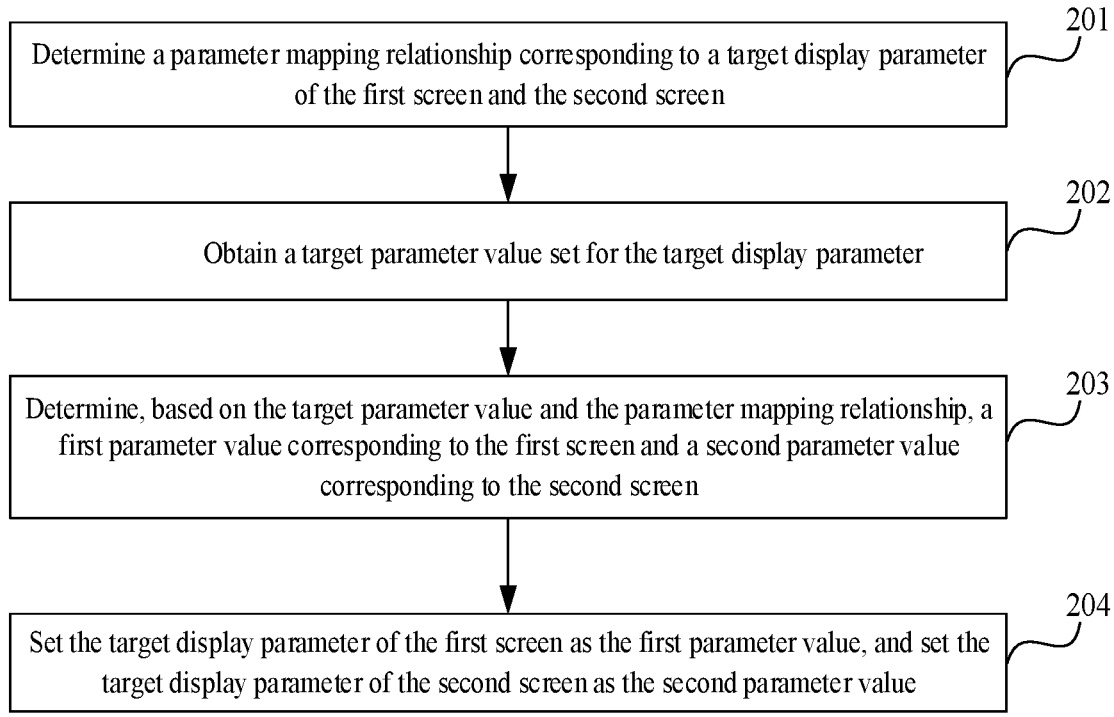
FIG. 2 is a flowchart of an embodiment of a display control method provided by an embodiment of the present disclosure.

Referring to FIG. 2, FIG. 2 is a flowchart of an embodiment of a display control method provided by an embodiment of the present disclosure. The display control method may be applied to a head-mounted device. The head-mounted device includes a first screen and a second screen. The display control method may include the following steps.

At 201, determining a parameter mapping relationship corresponding to a target display parameter of the first screen and the second screen.

In an implementation, in order to distinguish different screens, a screen identifier may be set for each screen, and different screens are distinguished by means of the screen identifier. The first screen and the second screen may be screens of the same model.

In practical applications, the first screen and the second screen may be in a one-to-one or one-to-many relationship, i.e., a target screen in the first screen and the second screen may include one screen, and other screens except the target screen may include a plurality of screens. The target screen may be the first screen or the second screen. For a method for determining the target screen, reference may be made to the description of the following embodiments, and details are not repeatedly described herein. For example, when the first screen serves as a target screen, the first screen may include one screen, and the second screen may include a plurality of screens. When the second screen serves as a target screen, the second screen may include one screen, and the first screen may include a plurality of screens.

The parameter mapping relationship may be a parameter conversion equation or function corresponding to the target display parameter of the first screen and the second screen, which may be represented by y=f(x), where x may be a parameter value of the target screen, and y may be a parameter value of the other screens calculated from the parameter value of the target screen. By means of the parameter mapping relationship, the parameter values corresponding to the target display parameter of the first screen and the second screen can be mutually converted.

Parameters such as size, type and shape of the first screen and the second screen are not within the range of the target display parameter involved in the present disclosure. For example, a shape of a screen may be set as any one of shapes such as a rectangle, a circle, and a polygon according to practical requirements, and parameters such as the size, shape, and type of the screen are not excessively limited in the present disclosure.

At 202, obtaining a target parameter value set for the target display parameter.

The obtaining the target parameter value set for the target display parameter can include obtaining the target parameter value set by the user for the target display parameter in the head-mounted device.

As a method, a setting page of the target display parameter may be output in the head-mounted device. The user may input parameter values manually, with a handle or through eyeballs, so that the head-mounted device detects the target parameter value set by the user for the target display parameter. Typically, the head-mounted device can detect the target parameter value corresponding to the target display parameter.

The target display parameter can be a parameter related to the display effect of the screen, such as a brightness parameter and a color temperature parameter.

At 203, determining, based on the target parameter value and the parameter mapping relationship, a first parameter value corresponding to the first screen and a second parameter value corresponding to the second screen.

The parameter mapping relationship may include a calculation relationship of a parameter difference between the first screen and the second screen. The parameter difference between the first screen and the second screen may be calculated by means of the parameter mapping relationship. The parameter difference is a difference between actual values respectively corresponding to the target display parameter of the first screen and the second screen when the target display parameter of the first screen and the second screen are set as the same parameter value. For example, if the brightness parameters of the first screen and the second screen are both set as 100, the actual brightness of the first screen is 98, and the actual brightness of the second screen is 103, the parameter difference between the first screen and the second screen is 5.

At 204, setting the target display parameter of the first screen as the first parameter value, and setting the target display parameter of the second screen as the second parameter value.

The setting the target display parameter of the first screen as the first parameter value, and setting the target display parameter of the second screen as the second parameter value may include: generating a first setting instruction for setting the target display parameter of the first screen as the first parameter value, and generating a second setting instruction for setting the target display parameter of the second screen as the second parameter value, providing the first setting instruction and the second setting instruction to the head-mounted device for the head-mounted device, in response to the first setting instruction and the second setting instruction, to set the target display parameter of the first screen as the first parameter value, and set the target display parameter of the second screen as the second parameter value.

In the embodiment of the present disclosure, a first screen and a second screen in a head-mounted device can be obtained. By determining a parameter mapping relationship corresponding to a target display parameter of the first screen and the second screen, parameter analysis between two or more screens can be performed. Furthermore, after obtaining a target parameter value set for the target display parameter, a first parameter value corresponding to the first screen and a second parameter value corresponding to the second screen can be determined based on the target parameter value and the parameter mapping relationship, thereby setting the target display parameter of the first screen as the first parameter value and setting the target display parameter of the second screen as the second parameter value. By means of the parameter mapping relationship between screens, accurate parameter setting can be performed between a plurality of screens, thereby achieving accurate parameter settings for different screens by using the target parameter value, and improving accuracy and efficiency of display parameter setting.

Figure 3:
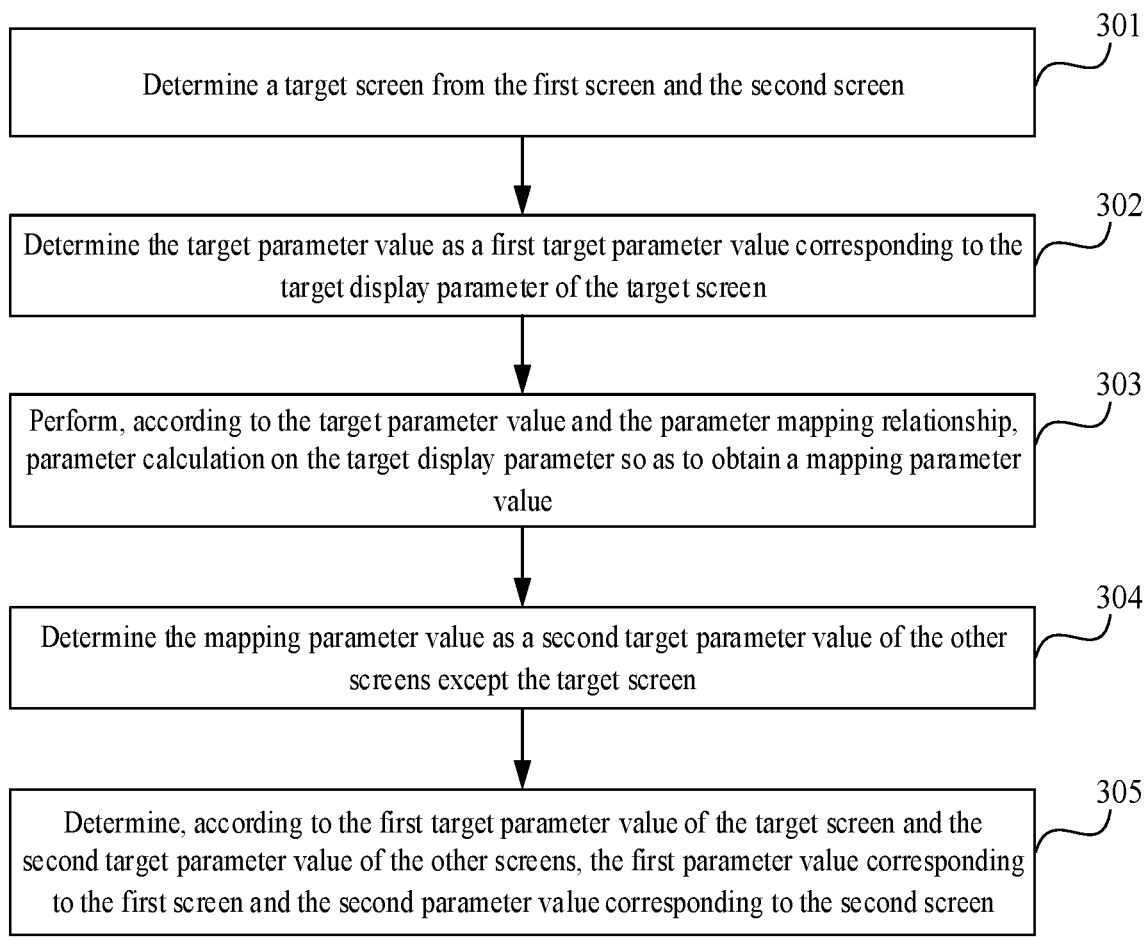
FIG. 3 is a flowchart of another embodiment of a display control method provided by an embodiment of the present disclosure.

In order to obtain an accurate parameter setting result, when a parameter value is determined, parameter setting may be performed on any screen thereof first, so as to improve the accuracy of the setting of the screen. As shown in FIG. 3, FIG. 3 is a flowchart of another embodiment of a display control method provided by an embodiment of the present disclosure. The method differs from the embodiment shown in FIG. 2 in that: the determining, based on the target parameter value and the parameter mapping relationship, the first parameter value corresponding to the first screen and the second parameter value corresponding to the second screen may include the following steps.

At 301, determining a target screen from the first screen and the second screen.

At 302, determining the target parameter value as a first target parameter value corresponding to the target display parameter of the target screen.

At 303, performing, according to the target parameter value and the parameter mapping relationship, parameter calculation on the target display parameter so as to obtain a mapping parameter value.

The parameter mapping relationship may be a calculation relationship of a parameter difference between the first screen and the second screen, and may specifically include a linear fitting function corresponding to the parameter difference. The target parameter value may be input into the parameter mapping relationship, an output obtained through calculation of the parameter mapping relationship may be the parameter difference value, and the mapping parameter value may be obtained through calculation of the parameter difference value and the target parameter value. The target parameter value and the mapping parameter value may be set as a parameter value corresponding to the target display parameter of the first screen and the second screen, so as to obtain a first parameter value of a first display parameter and a second parameter value of a second display parameter.

At 304, determining the mapping parameter value as a second target parameter value of the other screens except the target screen.

At 305, determining, according to the first target parameter value of the target screen and the second target parameter value of the other screens, the first parameter value corresponding to the first screen and the second parameter value corresponding to the second screen.

The target screen may be determined from the first screen and the second screen, and generally may be determined randomly without exceeding a parameter value range.

In the embodiment of the present disclosure, any screen may be determined as the target screen so as to determine the target parameter value as a first target parameter value corresponding to the target display parameter of the target screen, perform, according to the target parameter value and the parameter mapping relationship, parameter calculation on the target display parameter so as to obtain a mapping parameter value, and determine the mapping parameter value as a second target parameter value of the other screens except the target screen, and the first parameter value corresponding to the first screen and the second parameter value corresponding to the second screen can be determined according to the first target parameter value corresponding to the target screen and the second target parameter value corresponding to the other screens. By means of parameter setting of the target screen, a target parameter of the other target screens can be accurately determined, thereby achieving accurate obtaining of parameter values of screens, and improving the obtaining efficiency and accuracy of the screens.

As another embodiment, after the obtaining the target parameter value set for the target display parameter, the method further includes:

obtaining a first parameter value range corresponding to the target display parameter of the first screen and a second parameter value range corresponding to the target display parameter of the second screen; and obtaining a target setting value of the target display parameter;

the obtaining the target parameter value set for the target display parameter includes:

if it is determined that the target setting value is within both the first parameter value range and the second parameter value range, determining the target setting value as the target parameter value;

the determining the target screen from the first screen and the second screen includes: determining the target screen randomly from the first screen and the second screen.

In an implementation, the obtaining the target setting value of the target display parameter may include: outputting a parameter setting range of the target display parameter, and detecting a value selected by the user from the parameter setting range as the target setting value. Taking the target display parameter being brightness as an example, the brightness setting range may be output as 1-100, and any value selected by the user from 1-100 may be detected as the target setting value. For example, when the user selects 50, the target setting value is 50.

The obtaining the target setting value of the target display parameter may further include: obtaining a default value set for the target display parameter, so as to take the default value as the target setting value.

The step of determining whether the target setting value is within the first parameter value range may include: determining whether the target setting value is less than a first maximum value of the first parameter value range and greater than a first minimum value of the first parameter value range. If so, the target setting value is within the first parameter value range; if not, the target setting value is not within the first parameter value range.

The step of determining whether the target setting value is within the second parameter value range may include: determining whether the target setting value is less than a second maximum value of the second parameter value range and greater than a second minimum value of the second parameter value range. If so, the target setting value is within the second parameter value range; if not, the target setting value is not within the second parameter value range.

A maximum value of any parameter value range may be a maximum value of the parameter value range, and a minimum value may be a minimum value of the parameter value range. Generally, the parameter value range may be considered as a closed interval.

For ease of understanding, the first parameter value range is represented by (a1, a2), and the second parameter value range is represented by (b1, b2). If the target setting value T is between (a1, a2) or (b1, b2), the target setting value is determined as the target parameter value.

In the embodiment of the present disclosure, after the obtaining target parameter value set for the target display parameter, the first parameter value range corresponding to the target display parameter of the first screen and the second parameter value range corresponding to the target display parameter of the second screen may be used, and the value of the target display parameter may be constrained by using the first parameter value range and the second parameter value range. When the target setting value provided by the user is obtained, the candidate parameter may be determined as a display parameter when the target setting value does not exceed any of the value range of two screens, thereby achieving the accurate setting of the target screen, improving the setting effectiveness of the screens, avoiding invalid parameter setting, and achieving more accurate control of the screens.

In a possible design, the obtaining the target parameter value set for the target display parameter can include:

if it is detected that the target setting value is within the first parameter value range and not within the second parameter value range, determining the target setting value as the target parameter value;

the determining the target screen from the first screen and the second screen includes:

determining the first screen as the target screen.

When the target setting value is within the first parameter value range, the first screen may be used as the target screen, thereby achieving the setting of the value range of the first screen.

Likewise, the first parameter value range is represented by (a1, a2), and the second parameter value range is represented by (b1, b2). If the target setting value T is between (a1, a2) and not between (b1, b2), the target setting value is determined as the target parameter value, and the first screen is determined as the target screen.

In the embodiment of the present disclosure, when it is detected that the target setting value is within the first parameter value range and not within the second parameter value range, the target setting value can be determined as the target parameter value, and in this case, the first screen can be determined as the target screen. By determining a target setting value, the target screen can be accurately selected, avoiding a target parameter value within the parameter value range of the selected target screen, and improving the accuracy of display control.

In yet another possible design, the obtaining the target parameter value set for the target display parameter includes:

if it is detected that the target setting value is not within the first parameter value range and within the second parameter value range, determining the target setting value as the target parameter value;

the determining the target screen from the first screen and the second screen includes:

determining the second screen as the target screen.

When the target setting value is within the second parameter value range, the second screen may be used as the target screen, thereby achieving the setting of the value range of the second screen.

Likewise, the first parameter value range is represented by (a1, a2), and the second parameter value range is represented by (b1, b2). If the target setting value T is not between (a1, a2) and between (b1, b2), the target setting value is determined as the target parameter value, and the second screen is determined as the target screen.

In the embodiment of the present disclosure, when it is detected that the target setting value is not within the first parameter value range and within the second parameter value range, the target setting value can be determined as the target parameter value, and in this case, the second screen can be determined as the target screen. By determining a target setting value, the target screen can be accurately selected, avoiding a target parameter value within the parameter value range of the selected target screen, and improving the accuracy of display control.

In yet another possible design, the obtaining the target parameter value set for the target display parameter can include:

if it is determined that the target setting value is neither within the first parameter value range nor within the second parameter value range, determining whether the target setting value is greater than a maximum parameter value in the first parameter value range and the second parameter value range;

if so, obtaining a first maximum value from the first parameter value range and a second maximum value from the second parameter value range; determining a minimum value in the first maximum value and the second maximum value as the target parameter value; and if not, obtaining a first minimum value from the first parameter value range and a second minimum value from the second parameter value range; determining a maximum value in the first minimum value and the second minimum value as the target parameter value;

the determining the target screen from the first screen and the second screen includes:

determining, based on a parameter value range corresponding to the target parameter value, a screen corresponding to the parameter value range as the target screen.

The maximum parameter value in the first parameter value range and the second parameter value range can be determined from the first maximum value in the first parameter value range and the second maximum value in the second parameter value range, and specifically, a maximum value in the first maximum value and the second maximum value can be determined as the maximum parameter value.

When it is determined that the target setting value is neither within first parameter value range nor within the second parameter value range, it may be determined that the target setting value is within a value range outside the first parameter value range and the second parameter value range, generally including a range greater than a range corresponding to the maximum parameter value thereof or a range less than a range corresponding to the minimum value thereof.

When it is determined that the target setting value is greater than the maximum parameter value in the first parameter value range and the second parameter value range, a first maximum value may be obtained from the first parameter value range, and a second maximum value may be obtained from the second parameter value range; the minimum value in the first maximum value and the second maximum value can be determined as the target parameter value.

When it is determined that the target setting value is neither within the first parameter value range nor within the second parameter value range, when it is determined that the target setting value is not within the value range outside the first parameter value range and the second parameter value range, it may be determined that the target setting value is outside the first parameter value range and the second parameter value range and is less than a range corresponding to a minimum parameter value thereof.

Likewise, the first parameter value range is represented by (a1, a2), and the second parameter value range is represented by (b1, b2). If the target setting value T is not between (a1, a2) and not between (b1, b2), it is determined whether the target setting value T is greater than max {a2, b2}, and if so, the target parameter value is determined as min{a2, b2}. Otherwise, it is continued to determine whether the target setting value T is less than min {a1, b1}, if so, the target parameter value can be determined as max{a1, b1}, and in this case, the screen corresponding to the parameter value range at which the selected parameter value is located can be determined as the target screen. For example, it is assumed that the target parameter value is a2, then the first screen is determined as the target screen.

In the embodiment of the present disclosure, when the target setting value is both within the parameter value ranges of the two screens, whether the target setting value is greater than the maximum parameter value in the first parameter value range and the second parameter value range can be determined, if so, the minimum value of the maximum values of the screens can be determined as the target parameter value, and the smaller maximum value can be determined as the target parameter value, thereby avoiding the parameter of the another screen from exceeding its maximum range. If not, the maximum value of the minimum values of the two screens can be determined as the target parameter value, and the larger minimum value can be determined as the target parameter value, thereby avoiding the parameter of another screen from exceeding its minimum range. By means of the parameter value range within the value of the target parameter value, the screen corresponding to the parameter value range can be taken as the target screen, thereby achieving the accurate selection of the target screen.

Figure 4:
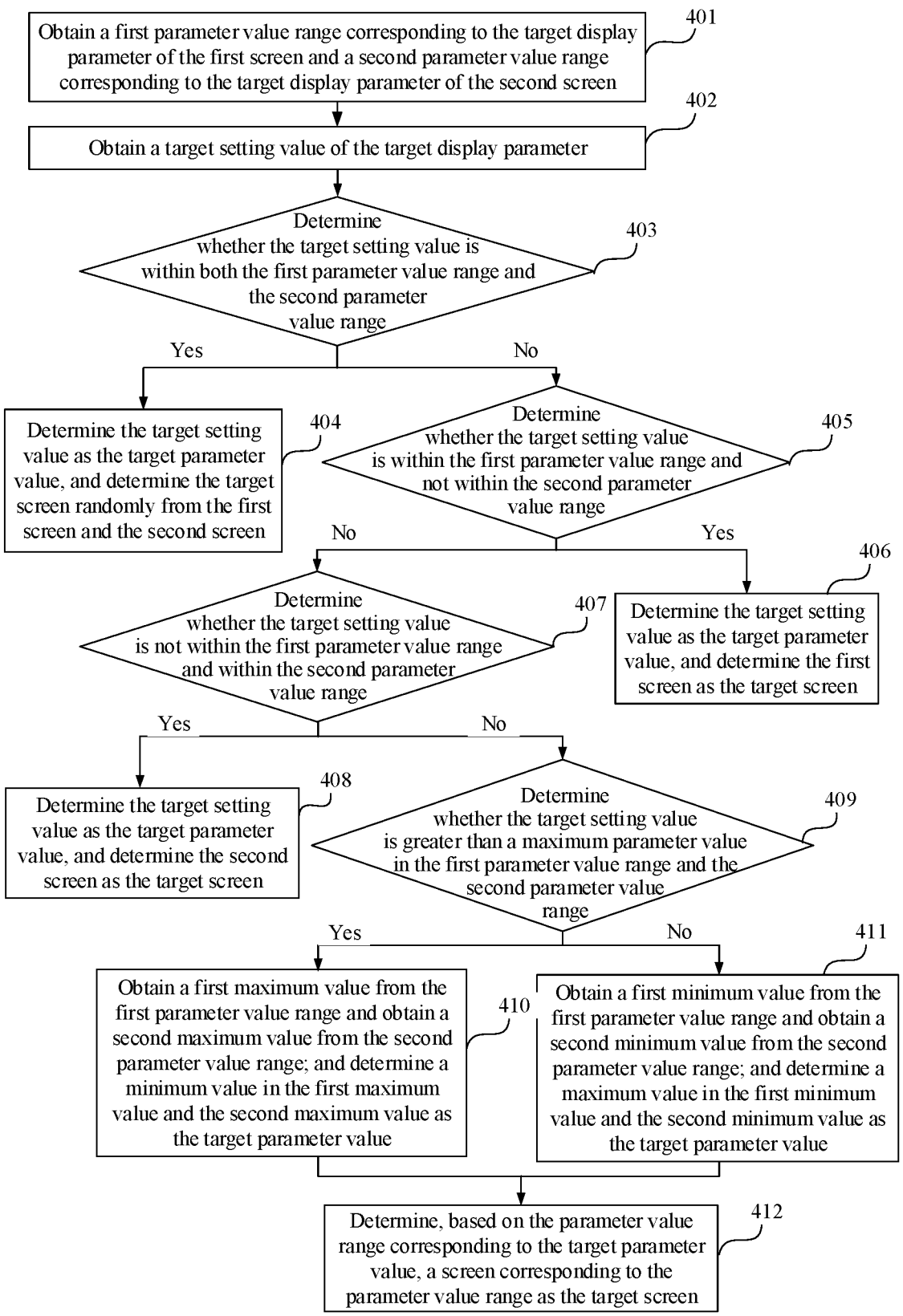
FIG. 4 is a flowchart of another embodiment of a display control method provided by an embodiment of the present disclosure.

For ease of understanding, the selection steps of the target display parameter and the target screen are described in detail below with reference to FIG. 4. As shown in FIG. 4, FIG. 4 is a flowchart of another embodiment of a display control method provided by an embodiment of the present disclosure, which differs from the embodiments in FIGS. 2 and 3 in that after the obtaining the target parameter value set for the target display parameter, the method further includes the following steps.

At 401, obtaining a first parameter value range corresponding to the target display parameter of the first screen and a second parameter value range corresponding to the target display parameter of the second screen.

Some steps in this embodiment are the same as those in the foregoing embodiments, and are not further described herein.

At 402, obtaining a target setting value of the target display parameter.

At 403, determining whether the target setting value is within both the first parameter value range and the second parameter value range; if so, performing step 404; if not, performing step 405.

At 404: determining the target setting value as the target parameter value, and determining the target screen randomly from the first screen and the second screen.

At 405, determining whether the target setting value is within the first parameter value range and not within the second parameter value range; if so, performing step 406; if not, performing step 407.

At 406, determining the target setting value as the target parameter value, and determining the first screen as the target screen.

At 407, determining whether the target setting value is not within the first parameter value range and within the second parameter value range; if so, performing step 408; if not, performing step 409.

At 408, determining the target setting value as the target parameter value, and determining the second screen as the target screen.

At 409, determining whether the target setting value is greater than a maximum parameter value in the first parameter value range and the second parameter value range; and if so, performing step 410; if not, performing step 411.

At 410, obtaining a first maximum value from the first parameter value range and obtaining a second maximum value from the second parameter value range; and determining a minimum value in the first maximum value and the second maximum value as the target parameter value.

At 411, obtaining a first minimum value from the first parameter value range and obtaining a second minimum value from the second parameter value range; and determining a maximum value in the first minimum value and the second minimum value as the target parameter value.

At 412, determining, based on the parameter value range corresponding to the target parameter value, a screen corresponding to the parameter value range as the target screen.

In the embodiment of the present disclosure, by means of multiple determination of the target setting value, accurate determination of the target parameter value is achieved, avoiding the problem that the target display parameter exceeds a range of a parameter setting on each screen, which results in an invalid setting, and improving the validity and accuracy of display control.

Figure 5:
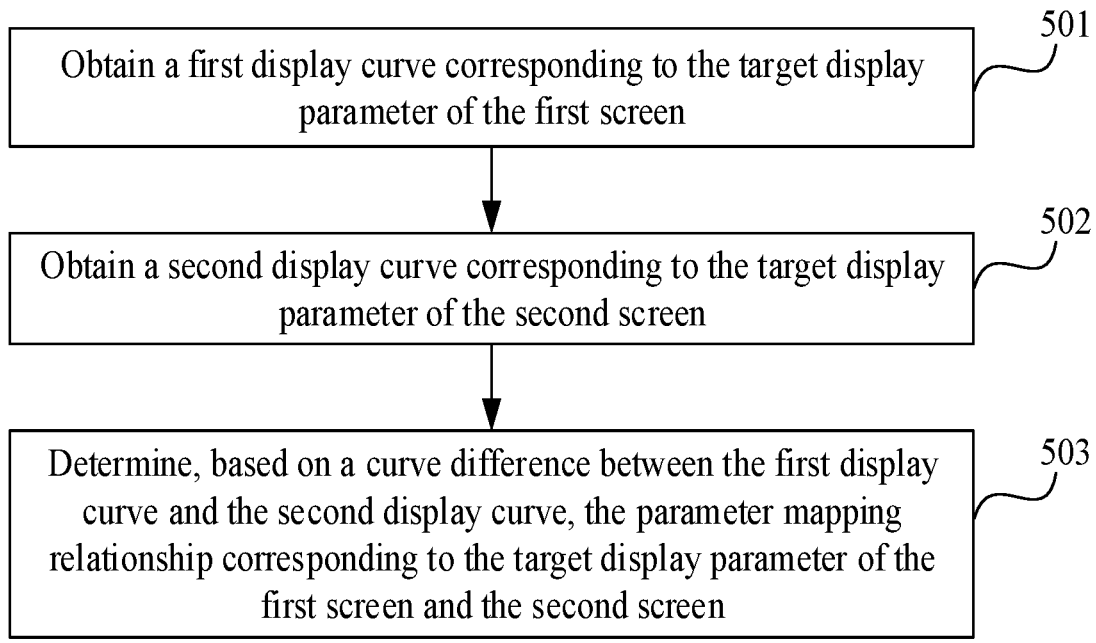
FIG. 5 is a flowchart of another embodiment of a display control method provided by an embodiment of the present disclosure.

In order to obtain an accurate parameter mapping relationship, as shown in FIG. 5, FIG. 5 is a flowchart of another embodiment of a display control method provided by an embodiment of the present disclosure. The head-mounted device further includes a first sensor disposed on the first screen and a second sensor disposed on the second screen. The determining the parameter mapping relationship corresponding to the target display parameter of the first screen and the second screen can include:

501: obtaining a first display curve corresponding to the target display parameter of the first screen;

502: obtaining a second display curve corresponding to the target display parameter of the second screen; and 503: determining, based on a curve difference between the first display curve and the second display curve, the parameter mapping relationship corresponding to the target display parameter of the first screen and the second screen.

The determining, based on the curve difference between the first display curve and the second display curve, the parameter mapping relationship corresponding to the target display parameter of the first screen and the second screen can include: determining a first curve function of a first display curve, and determining a second curve function of a second display curve; performing, by using a one-order function, function fitting on the first curve function and the second curve function, so as to obtain a curve equation with an unknown parameter; solving the curve equation so as to obtain a curve equation with a known parameter; and converting the curve equation with a known parameter into the parameter mapping relationship corresponding to the target display parameter of the first screen and the second screen. The parameter mapping relationship can specifically include a linear fitting function corresponding to the parameter difference.

The one-order function may include a scale coefficient and a compensation offset. Taking an example in which the first curve function is represented by F(A) and the second curve function is represented by F(B), the one-order function may be represented as F(A)=k*F(B)+b, where k is a proportional coefficient, and b is a compensation offset. Values of K and b may be solved by using F(A) and F(B). The parameter mapping relationship may be expressed as δ=F(A)−F(B)=k*F(B)+b−F(B)=(k−1)F(B)+b. When k and b are determined, the parameter difference between the first screen and the second screen may be determined by means of the parameter mapping relationship, where δ may be a linear fitting function.

In the embodiment of the present disclosure, by means of the first display curve corresponding to the first screen and the second display curve corresponding to the second screen, an accurate analysis can be performed on the curve difference between the first screen and the second screen, thereby achieving the visual analysis by using the display curve, and improving the obtaining efficiency and accuracy of the parameter mapping relationship.

In one possible design, the method further includes:
obtaining target setting data based on parameter setting processing of the target display parameter; and
respectively setting the first screen and the second screen as the target setting data;
the obtaining the first display curve corresponding to the target display parameter of the first screen includes:
performing, by using a first sensor disposed on the first screen, parameter detection on the target display parameter of the set first screen so as to obtain first detection data; and
performing, based on the target setting data and the first detection data, fitting processing on a display curve of the first screen so as to obtain a first display curve;
the obtaining the second display curve corresponding to the target display parameter of the second screen includes:
performing, by using a second sensor disposed on the second screen, parameter detection on the target display parameter of the set second screen so as to obtain second detection data; and
performing, based on the target setting data and the second detection data, fitting processing on a display curve of the second screen so as to obtain a second display curve.

The first sensor may be disposed on the first screen, and the second sensor may be disposed on the second screen. When any screen sets target setting data in the target display parameter, the screen may actually generate detection data in the target display parameter, where the detection data may be obtained through detection by a sensor.

Taking the display parameter being a brightness parameter or a color temperature parameter as an example, the first sensor and the second sensor may be RGB (RedGreenBlue, color) sensors. A brightness parameter value and a color temperature parameter value of the screen may be detected by the RGB sensors. First detection data transmitted by the first sensor and second detection data transmitted by the second sensor may be detected.

In an implementation, the obtaining the target setting data based on parameter setting processing of the target display parameter may include: based on a parameter setting range of the target display parameter including a minimum parameter value and a maximum parameter value, starting from the minimum parameter value, successively determining target setting data according to a set step length until the maximum parameter value is reached. For example, the parameter setting range includes 1-100, if the step length is 1, the target setting data can start from 1 and increase by 1 in sequence until parameter values such as 1, 2, and 3 can be set to 100, and each value can be used as the target setting data.

Figure 6:
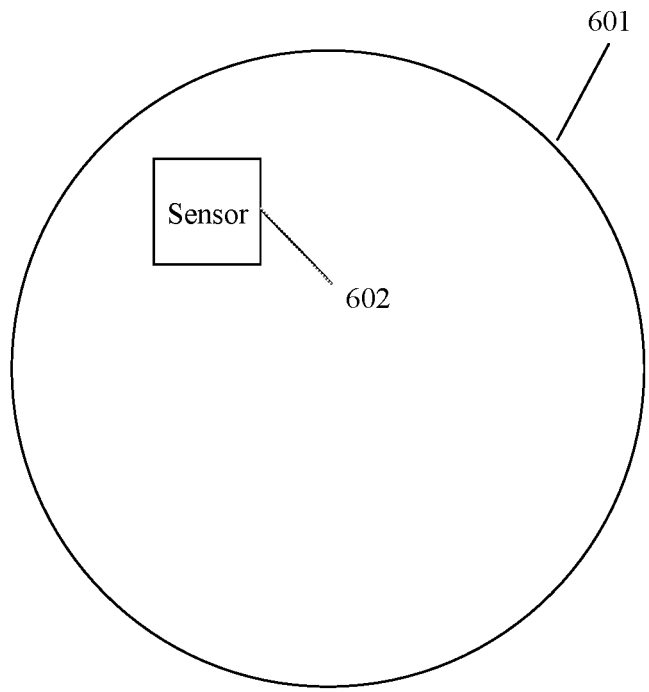
FIG. 6 is an example diagram of a setting of a display screen and a sensor provided by an embodiment of the present disclosure.

For ease of understanding, referring to FIG. 6, a sensor 602 may be disposed on a screen 601. The sensor 602 may perform parameter detection on a target display parameter on the screen 601 so as to obtain corresponding detection data. For both the first sensor of the first screen and the second sensor of the second screen, reference may be made to this setting diagram.

In the embodiment of the present disclosure, target setting data is obtained by performing parameter setting processing on the target display parameter, and the first screen and the second screen can be set as the target setting data respectively, thereby achieving display setting of the screens. Afterwards, the parameter value of the target display parameter of the set first and second screens are detected respectively, so as to obtain first detection data of the first screen and second detection data of the second screen. By obtaining the detection data, the first display curve of the first screen and the second display curve of the second screen can be accurately obtained, achieving the accurate obtaining of the display curves of screens, and improving the obtaining efficiency and accuracy of the screens.

In a possible design, the parameter mapping relationship includes a linear fitting function; and the target display parameter includes one or more of the following parameters: a brightness parameter, a color temperature parameter, a contrast parameter and a refresh rate parameter. In addition, the display parameters may include, for example, a contrast parameter, an HDR (High Dynamic Range Imaging) parameter, a color gamut parameter, a viewing angle parameter, and the like. The specific types of parameters are not limited in the present disclosure.

In the embodiment of the present disclosure, the parameter mapping relationship may be set as the linear fitting function, the complexity of the linear fitting function is low, and parameter mapping between screens may be quickly and accurately implemented. The target display parameter is set to include one or more of the brightness parameter, the color temperature parameter, the contrast parameter and the refresh rate parameter, thereby achieving the same setting of a plurality of display parameters of the screen, and improving the setting and managing efficiency of parameters.

As an embodiment, the setting the target display parameter of the first screen as the first parameter value, and setting the target display parameter of the second screen as the second parameter value includes:
generating parameter setting information based on the first parameter value corresponding to the first screen and the second parameter value corresponding to the second screen; and
outputting the parameter setting information to the head-mounted device, where the parameter setting information instructs the head-mounted device to set the first screen as the first parameter value and set the second screen as the second parameter value.

In the embodiment of the present disclosure, the parameter setting information is generated based on the first parameter value corresponding to the first screen and the second parameter value corresponding to the second screen; by outputting the parameter setting information to the head-mounted device, the parameter setting information can be used to instruct the head-mounted device to set the first screen as the first parameter value and set the second screen as the second parameter value. By means of control interaction with the head-mounted device, effective display control of the screen in the head-mounted device can be achieved, improving the setting efficiency and accuracy of parameters.

In an implementation, after the setting the target display parameter of the first screen as the first parameter value, and setting the target display parameter of the second screen as the second parameter value, the method can further includes:
  generating setting prompt information for setting the target display parameter of the first screen as the first parameter value and setting the target display parameter of the second screen as the second parameter value; and
  outputting the setting prompt information to the head-mounted device, where the setting prompt information instructs the head-mounted device to output prompt information for setting the target display parameter of the first screen as the first parameter value and setting the target display parameter of the second screen as the second parameter value.

In the embodiment of the present disclosure, the actual setting condition of the target display parameter of the first screen and the second screen may be prompted by outputting the setting prompt information, thereby achieving effectively prompts for the screens.

Figure 7:
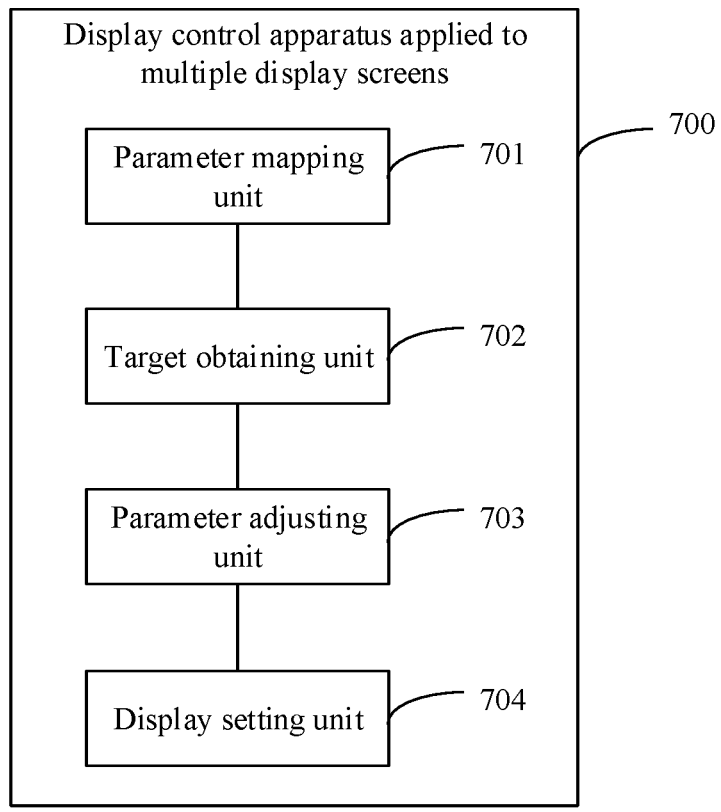
FIG. 7 is a structural schematic diagram of a display control apparatus provided by an embodiment of the present disclosure.

As shown in FIG. 7, FIG. 7 is a structural schematic diagram of a display control apparatus provided by an embodiment of the present disclosure. The apparatus may be disposed on a head-mounted device. The head-mounted device includes a first screen and a second screen. The display control apparatus may include the following units:
  a parameter mapping unit 701, configured to determine a parameter mapping relationship corresponding to a target display parameter of the first screen and the second screen;
  a target obtaining unit 702, configured to obtain a target parameter value set for the target display parameter;
  a parameter adjusting unit 703, configured to determine, based on the target parameter value and the parameter mapping relationship, a first parameter value corresponding to the first screen and a second parameter value corresponding to the second screen; and
  a display setting unit 704, configured to set the target display parameter of the first screen as the first parameter value, and set the target display parameter of the second screen as the second parameter value.

As an embodiment, the parameter adjusting unit 703 may include:
  a target determining module, configured to determine a target screen from the first screen and the second screen;
  a data determining module, configured to determine the target parameter value as a first target parameter value corresponding to the target display parameter of the target screen;
  a mapping determining module, configured to perform, according to the target parameter value and the parameter mapping relationship, parameter calculation on the target display parameter so as to obtain a mapping parameter value;
  a first determining module, configured to determine the mapping parameter value as a second target parameter value of the other screens except the target screen; and
  a second determining module, configured to determine, according to the first target parameter value of the target screen and the second target parameter value of the other screens, the first parameter value corresponding to the first screen and the second parameter value corresponding to the second screen.

In one possible design, the apparatus further includes:
  a range obtaining unit, configured to obtain a first parameter value range corresponding to the target display parameter of the first screen and a second parameter value range corresponding to the target display parameter of the second screen; and
  a candidate detecting unit, configured to obtain a target setting value of the target display parameter;
  the target obtaining unit 702 can include:
  a third determining module, configured to, if it is determined that the target setting value is within both the first parameter value range and the second parameter value range, determining the target setting value as the target parameter value;
  the target determining module can include:
  a first determining submodule, configured to determine the target screen randomly from the first screen and the second screen.

In yet another possible design, the target obtaining unit 702 can include:
  a fourth determining module, configured to, if it is detected that the target setting value is within the first parameter value range and not within the second parameter value range, determining the target setting value as the target parameter value;
  the target determining module can include:
  a second determining submodule, configured to determine the first screen as the target screen.

In yet another possible design, the target obtaining unit 702 can include:
  a fifth determining module, configured to, if it is detected that the target setting value is not within the first parameter value range and within the second parameter value range, determining the target setting value as the target parameter value;
  the target determining module can include:
  a third determining submodule, configured to determine the second screen as the target screen.

In yet another possible design, the target obtaining unit 702 can include:
  a sixth determining module, configured to, if it is determined that the target setting value is neither within the first parameter value range nor within the second parameter value range, determining whether the target setting value is greater than a maximum parameter value in the first parameter value range and the second parameter value range;
  a first processing module, configured to: if so, obtain a first maximum value from the first parameter value range and a second maximum value from the second parameter value range; and determine a minimum value in the first maximum value and the second maximum value as the target parameter value; and
  a second processing module, configured to: if not, obtain a first minimum value from the first parameter value range and a second minimum value from the second parameter value range; and determine a maximum value in the first minimum value and the second minimum value as the target parameter value;
  the target determining module can include:
  a fourth determining submodule, configured to determine, based on a parameter value range corresponding to the target parameter value, a screen corresponding to the parameter value range as the target screen.

As an embodiment, the parameter mapping unit includes:
a first obtaining module, configured to obtain a first display curve corresponding to the target display parameter of the first screen;
a second obtaining module, configured to obtain a second display curve corresponding to the target display parameter of the second screen; and
a curve mapping module, configured to determine, based on a curve difference between the first display curve and the second display curve, the parameter mapping relationship corresponding to the target display parameter of the first screen and the second screen.

In some possible designs, the apparatus further includes:
a data setting unit, configured to obtain target setting data based on parameter setting processing of the target display parameter; and
a parameter setting unit, configured to respectively set the first screen and the second screen as the target setting data;
the first obtaining module includes:
a first detecting submodule, configured to perform, by using a first sensor disposed on the first screen, parameter detection on the target display parameter of the set first screen so as to obtain first detection data; and
a first fitting submodule, configured to perform, based on the target setting data and the first detection data, fitting processing on a display curve of the first screen so as to obtain a first display curve;
the second obtaining module includes:
a second detecting submodule, configured to perform, by using a second sensor disposed on the second screen, parameter detection on the target display parameter of the set second screen so as to obtain second detection data; and
a second fitting submodule, configured to, perform, based on the target setting data and the second detection data, fitting processing on a display curve of the second screen so as to obtain a second display curve.

In a possible design, the parameter mapping relationship includes a linear fitting function; and the target display parameter includes one or more of the following parameters: a brightness parameter, a color temperature parameter, a contrast parameter and a refresh rate parameter.

In some embodiments, the display setting unit includes:
a setting generating module, configured to generate parameter setting information based on the first parameter value corresponding to the first screen and the second parameter value corresponding to the second screen; and
a setting output module, configured to output the parameter setting information to the head-mounted device, where the parameter setting information instructs the head-mounted device to set the first screen as the first parameter value and set the second screen as the second parameter value.

The apparatus provided by this embodiment may be used to execute the technical solution of the foregoing method embodiments, and its implementation principle and technical effects are similar, and are not repeatedly described herein in this embodiment.

Figure 8:
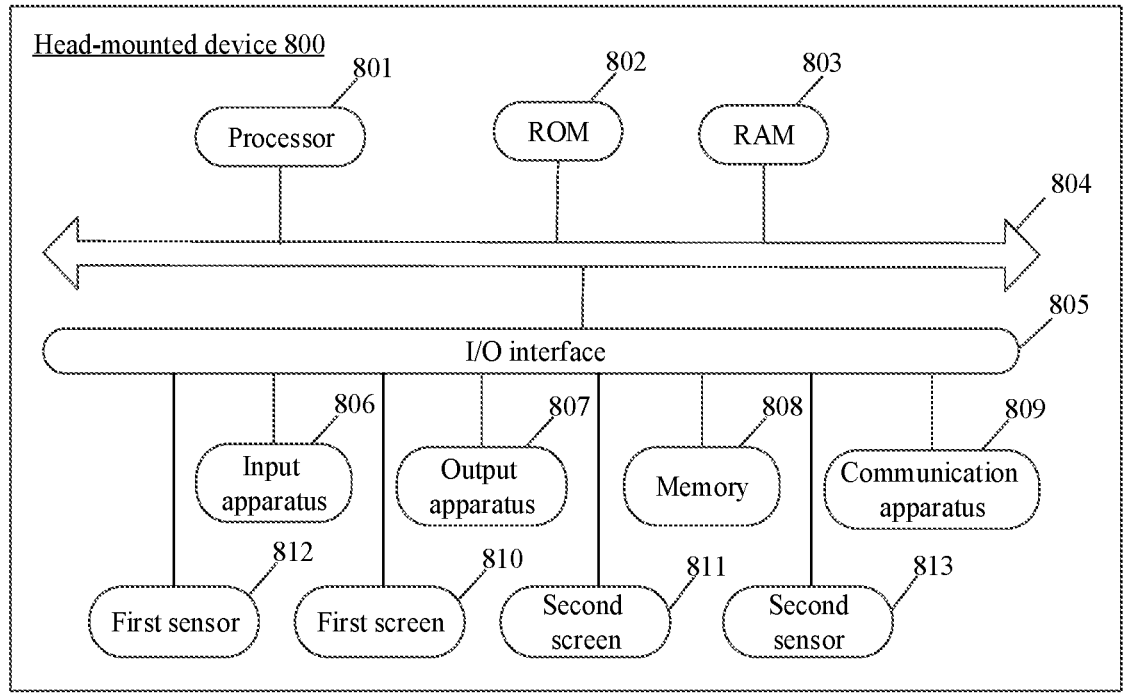
FIG. 8 is a structural schematic diagram of a hardware of a head-mounted device provided by an embodiment of the present disclosure.

As shown in FIG. 8, FIG. 8 shows a structural schematic diagram of a hardware of a head-mounted device 800 suitable for implementing an embodiment of the present disclosure. The head-mounted device shown in FIG. 8 is merely an example, and shall not impose any limitation on the functions and use scope of the embodiments of the present disclosure.

As shown in FIG. 8, the head-mounted device 800 may include a processor (such as a central processor, and a graphics processor) 801, which may perform various appropriate actions and processes according to a program stored in a read only memory (Read Only Memory, abbreviated as ROM) 802 or a program loaded into a random access memory (Random Access Memory, abbreviated as RAM) 803 from a memory 808. In the RAM 803, various programs and data required for operations of the head-mounted device 800 are also stored. The processor 801, the ROM 802 and the RAM 803 are connected to each other through a bus 804. An input/output (I/O) interface 805 is also connected to the bus 804.

Generally, the following apparatuses may be connected to the I/O interface 805: an input apparatus 806, including, for example, a touch pad, a keyboard, a mouse, a camera, a microphone, an accelerometer, or a gyroscope; an output apparatus 807, including, for example, a speaker, or a vibrator; a memory 808, including, for example, a magnetic tape, or a hard disk; and a communication apparatus 809. The communication apparatus 809 may enable the head-mounted device 800 to communicate wirelessly or in a wired manner with a further device for data exchange. Although FIG. 8 shows a head-mounted device 800 with various apparatuses, comprehensibly, there is no such requirement that all the apparatuses shown should be implemented or provided. Alternatively, more or fewer apparatuses may be implemented or provided.

Particularly, according to the embodiments of the present disclosure, the process described above with reference to the flowchart(s) may be implemented as a computer software program. For example, an embodiment of the present disclosure includes a computer program product including a computer program carried on a computer-readable medium, where the computer program includes program codes for performing the method shown in the flowchart(s). In such embodiments, the computer program may be downloaded and installed from the network through the communication apparatus 809, or installed from the memory 808 or from the ROM 802. When executed by the processor 801, the computer program performs the above-described functionalities defined in the method according to the embodiments of the present disclosure.

In addition, the head-mounted device 800 can include a first screen 810 and a second screen 811. There are circuit interconnections among the processor 801, the memory 808, the first screen 810, and the second screen 811. The first screen 810 and the second screen 811 may be connected to a bus through an I/O interface to establish a circuit interconnection with other apparatuses. In an implementation, the first screen and the second screen may include, for example, a touch screen, a Liquid Crystal Display (LCD), an ink screen, and the like. The present disclosure does not make too many limitations on the types of the first screen and the second screen.

The memory 808 stores computer execution instructions. The processor 801 executes the computer execution instructions stored in the memory, causing that the processor is configured to:
determine a parameter mapping relationship corresponding to a target display parameter of the first screen 810 and the second screen 811;
obtain a target parameter value set for the target display parameter;
determine, based on the target parameter value and the parameter mapping relationship, a first parameter value corresponding to the first screen 810 and a second parameter value corresponding to the second screen 811; and set the target display parameter of the first screen 810 as the first parameter value, and set the target display parameter of the second screen 811 as the second parameter value.

In some embodiments, a first sensor 812 may be disposed on the first screen 810. A second sensor 813 may also be disposed on the second screen 811. The first sensor 812 and the second sensor 813 may also be connected to the bus through an I/O interface to establish a circuit interconnection with other means.

The processor 801 is configured to: respectively set the first screen 810 and the second screen 811 as target setting data.

The first sensor 812 is configured to, when the first screen 810 is set as the target setting data, perform parameter detection on the first screen 810 so as to obtain first detection data.

The second sensor 813 is configured to, when the second screen 811 is set as the target setting data, perform parameter detection on the second screen 811 so as to obtain second detection data.

The processor 801 is further configured to: based on the target setting data and the first detection data, perform fitting processing on a display curve of the first screen 810 so as to obtain a first display curve; based on the target setting data and the second detection data, perform fitting processing on a display curve of the second screen 811 so as to obtain a second display curve; and determine, based on a curve difference between the first display curve and the second display curve, the parameter mapping relationship corresponding to the target display parameter of the first screen 810 and the second screen 811.

In addition, the processor 801 of the present disclosure may further be configured to execute any display control method provided by the foregoing embodiments. For specific execution steps of the processor 801, reference may be made to steps of the display control method, and details are not repeatedly described herein.

It should be noted that the above-described computer-readable medium in the present disclosure may be a computer-readable signal medium or a computer-readable storage medium or any combination thereof. The computer-readable storage medium may be, for example, but not limited to, an electrical, a magnetic, an optical, an electromagnetic, an infrared or a semiconductor system, apparatus or device, or any combination of the above. More specific examples of the computer-readable storage medium may include, but not limited to, an electrically connected portable computer disk with one or more wires, a hard disk, a random access memory (RAM), a read-only memory (ROM), an erasable programmable read-only memory (EPROM; or a flash memory), an optical fiber, a portable compact disc read-only memory (CD-ROM), an optical storage device, a magnetic storage device, or any suitable combination of the above. In the present disclosure, the computer-readable storage medium may be any tangible medium in which a program is contained or stored. The program may be used by or in combination with an instruction execution system, apparatus or device. In the present disclosure, the computer-readable signal medium may include a data signal propagated in a baseband or as a part of a carrier wave, where computer-readable program codes are carried. This propagated data signal may be in various forms, including but not limited to electromagnetic signals, optical signals or any suitable combination of the above. The computer-readable signal medium may also be any computer-readable medium other than the computer-readable storage medium. The computer-readable signal medium may send, propagate or transmit the program for use by or in combination with the instruction execution system, apparatus or device. The program codes contained in the computer-readable medium may be transmitted using any suitable medium, including but not limited to: electric wires, optical cables, RF (radio frequency), etc., or any suitable combination of the above.

The above-described computer-readable medium may be included in the above-described head-mounted device; or it may exist alone without being assembled into the head-mounted device.

The above-described computer-readable medium carries one or more programs which, when being executed by the head-mounted device, cause the head-mounted device to execute the method according to the foregoing embodiments.

Computer program codes configured to perform the operations of the present disclosure can be written in one or more programming languages or a combination thereof, including object-oriented programming languages, such as Java, Smalltalk and C++; and conventional procedural programming languages, such as "C" language or similar programming languages. The program codes may be completely executed on a user computer, partially executed on a user computer, executed as an independent software package, partially executed on a user computer and partially executed on a remote computer, or completely executed on a remote computer or a server. In a case involving the remote computer, the remote computer may be connected to a user computer through any kind of networks, including a local area network (Local Area Network, abbreviated as LAN) or a wide area network (Wide Area Network, abbreviated as WAN), or may be connected to an external computer (for example, connecting through Internet with use of an Internet service provider).

The flowcharts and block diagrams in the drawings illustrate architectures, functionalities and operations of possible implementations of the system, the method and the computer program product according to various embodiments of the present disclosure. In this regard, each block in the flowcharts or block diagrams may represent a module, a program segment or part of codes, which contains one or more executable instructions for implementing specified logical functionalities. It should also be noted that, in some alternative implementations, the functionalities marked in the blocks may also occur in a different order from that marked in the drawings. For example, two blocks shown in succession may actually be executed in parallel substantially, and sometimes they can be executed in a reverse order, depending on the functionalities involved. It should also be noted that each block in the block diagrams and/or the flowcharts, and a combination of blocks in the block diagrams and/or the flowcharts, may be implemented by a dedicated hardware-based system that performs specified functionalities or operations, or may be implemented by a combination of dedicated hardware and computer instructions.

The units involved in the embodiments described in the present disclosure may be implemented by means of software or hardware. In some cases, unit names do not limit the units. For example, the first acquiring unit can also be described as "a unit acquiring at least two Internet Protocol addresses.

The functionalities described above herein may be at least partially performed by one or more hardware logic components. For example, non-restrictively, the hardware logic components that may be used include the following exemplary types: a field programmable gate array (FPGA), an application specific integrated circuit (ASIC), an application specific standard product (ASSP), a system on chip (SOC), a complex programmable logic device (CPLD) and the like.

In the context of the present disclosure, the machine-readable medium may be a tangible medium in which a program for use by or in combination with an instruction execution system, apparatus or device can be contained or stored. The machine-readable medium may be a machine-readable signal medium or a machine-readable storage medium. The machine-readable medium may include, but not limited to, an electronic, a magnetic, an optical, an electromagnetic, an infrared, or a semiconductor system, apparatus or device, or any suitable combination of the foregoing. More specific examples of the machine-readable storage medium may include an electrically connected portable computer disk based on one or more wires, a hard disk, a random access memory (RAM), a read-only memory (ROM), an erasable programmable read-only memory (EPROM or flash memory), an optical fiber, a portable compact disc read-only memory (CD-ROM), an optical storage device, a magnetic storage device, or any suitable combination of the foregoing.

In a first aspect, one or more embodiments of the present disclosure provide a display control method, applied to a head-mounted device and includes a first screen and a second screen, where the method includes:
    determining a parameter mapping relationship corresponding to a target display parameter of the first screen and the second screen;
    obtaining a target parameter value set for the target display parameter;
    determining, based on the target parameter value and the parameter mapping relationship, a first parameter value corresponding to the first screen and a second parameter value corresponding to the second screen; and
    setting the target display parameter of the first screen as the first parameter value, and setting the target display parameter of the second screen as the second parameter value.

According to one or more embodiments of the present disclosure, the determining, based on the target parameter value and the parameter mapping relationship, the first parameter value corresponding to the first screen and the second parameter value corresponding to the second screen includes:
    determining a target screen from the first screen and the second screen;
    determining the target parameter value as a first target parameter value corresponding to the target display parameter of the target screen;
    performing, according to the target parameter value and the parameter mapping relationship, parameter calculation on the target display parameter so as to obtain a mapping parameter value;
    determining the mapping parameter value as a second target parameter value of the other screens except the target screen; and
    determining, according to the first target parameter value of the target screen and the second target parameter value of the other screens, the first parameter value corresponding to the first screen and the second parameter value corresponding to the second screen.

According to one or more embodiments of the present disclosure, after the obtaining the target parameter value set for the target display parameter, the method further includes:
    obtaining a first parameter value range corresponding to the target display parameter of the first screen and a second parameter value range corresponding to the target display parameter of the second screen; and
    obtaining a target setting value of the target display parameter;
    the obtaining the target parameter value set for the target display parameter includes:
    if it is determined that the target setting value is within both the first parameter value range and the second parameter value range, determining the target setting value as the target parameter value;
    the determining the target screen from the first screen and the second screen includes:
    determining the target screen randomly from the first screen and the second screen.

According to one or more embodiments of the present disclosure, the obtaining the target parameter value set for the target display parameter includes:
    if it is detected that the target setting value is within the first parameter value range and not within the second parameter value range, determining the target setting value as the target parameter value;
    the determining the target screen from the first screen and the second screen includes: determining the first screen as the target screen.

According to one or more embodiments of the present disclosure, the obtaining the target parameter value set for the target display parameter includes:
    if it is detected that the target setting value is not within the first parameter value range and within the second parameter value range, determining the target setting value as the target parameter value;
    the determining the target screen from the first screen and the second screen includes: determining the second screen as the target screen.

According to one or more embodiments of the present disclosure, the obtaining the target parameter value set for the target display parameter includes:
    if it is determined that the target setting value is neither within the first parameter value range nor within the second parameter value range, determining whether the target setting value is greater than a maximum parameter value in the first parameter value range and the second parameter value range;
    if so, obtaining a first maximum value from the first parameter value range and a second maximum value from the second parameter value range; determining a minimum value in the first maximum value and the second maximum value as the target parameter value; and
    if not, obtaining a first minimum value from the first parameter value range and a second minimum value from the second parameter value range; determining a maximum value in the first minimum value and the second minimum value as the target parameter value;
    the determining the target screen from the first screen and the second screen includes:
    determining, based on a parameter value range corresponding to the target parameter value, a screen corresponding to the parameter value range as the target screen.

According to one or more embodiments of the present disclosure, the determining the parameter mapping relationship corresponding to the target display parameter of the first screen and the second screen includes:
obtaining a first display curve corresponding to the target display parameter of the first screen;
obtaining a second display curve corresponding to the target display parameter of the second screen; and
determining, based on a curve difference between the first display curve and the second display curve, the parameter mapping relationship corresponding to the target display parameter of the first screen and the second screen.

According to one or more embodiments of the present disclosure, the head-mounted device further includes: a first sensor disposed on the first screen, and a second sensor disposed on the second screen; the method further includes:
obtaining target setting data based on parameter setting processing of the target display parameter; and
respectively setting the first screen and the second screen as the target setting data;
the obtaining the first display curve corresponding to the target display parameter of the first screen includes:
performing, by using a first sensor disposed on the first screen, parameter detection on the target display parameter of the set first screen so as to obtain first detection data; and
performing, based on the target setting data and the first detection data, fitting processing on a display curve of the first screen so as to obtain a first display curve;
the obtaining the second display curve corresponding to the target display parameter of the second screen includes:
performing, by using a second sensor disposed on the second screen, parameter detection on the target display parameter of the set second screen so as to obtain second detection data; and
performing, based on the target setting data and the second detection data, fitting processing on a display curve of the second screen so as to obtain a second display curve.

According to one or more embodiments of the present disclosure, the parameter mapping relationship includes a linear fitting function; and the target display parameter includes one or more of the following parameters: a brightness parameter, a color temperature parameter, a contrast parameter and a refresh rate parameter.

According to one or more embodiments of the present disclosure, the setting the target display parameter of the first screen as the first parameter value, and setting the target display parameter of the second screen as the second parameter value includes:
generating parameter setting information based on the first parameter value corresponding to the first screen and the second parameter value corresponding to the second screen; and
outputting the parameter setting information to the head-mounted device, where the parameter setting information instructs the head-mounted device to set the first screen as the first parameter value and set the second screen as the second parameter value.

In a second aspect, one or more embodiments of the present disclosure provide a display control apparatus, disposed on a head-mounted device and includes a first screen and a second screen, where the apparatus includes:
a parameter mapping unit, configured to determine a parameter mapping relationship corresponding to a target display parameter of the first screen and the second screen;
a target obtaining unit, configured to obtain a target parameter value set for the target display parameter;
a parameter adjusting unit, configured to determine, based on the target parameter value and the parameter mapping relationship, a first parameter value corresponding to the first screen and a second parameter value corresponding to the second screen; and
a display setting unit, configured to set the target display parameter of the first screen as the first parameter value, and set the target display parameter of the second screen as the second parameter value.

In a third aspect, one or more embodiments of the present disclosure provide a head-mounted device, including: a processor, a memory, a first screen, and a second screen; where there are circuit interconnections among the processor, the memory, the first screen, and the second screen;
the memory is configured to store computer execution instructions; and
the processor executes the computer execution instructions stored in the memory to cause the processor to be configured to:
determine a parameter mapping relationship corresponding to a target display parameter of the first screen and the second screen;
obtain a target parameter value set for the target display parameter;
determine, based on the target parameter value and the parameter mapping relationship, a first parameter value corresponding to the first screen and a second parameter value corresponding to the second screen; and
set the target display parameter of the first screen as the first parameter value, and set the target display parameter of the second screen as the second parameter value.

According to one or more embodiments of the present disclosure, the head-mounted device further includes: a first sensor disposed on the first screen and a second sensor disposed on the second screen; there are circuit interconnections among the first sensor, the second sensor, the memory, the processor, the first screen and the second screen;
the processor is configured to respectively set the first screen and the second screen as target setting data;
the first sensor is configured to, when the first screen is set as the target setting data, perform parameter detection on the first screen so as to obtain first detection data;
the second sensor is configured to, when the second screen is set as the target setting data, perform parameter detection on the second screen so as to obtain second detection data;
the processor is further configured to: perform, based on the target setting data and the first detection data, fitting processing on a display curve of the first screen so as to obtain a first display curve; perform, based on the target setting data and the second detection data, fitting processing on a display curve of the second screen so as to obtain a second display curve; and determine, based on a curve difference between the first display curve and the second display curve, the parameter mapping relationship corresponding to the target display parameter of the first screen and the second screen.

In a fourth aspect, one or more embodiments of the present disclosure provides a computer readable storage medium, where the computer readable storage medium stores therein computer execution instructions, a processor, when executing by a processor, implement the display control method according to the first aspect and various possible design of the first aspect.

In a fifth aspect, one or more embodiments of the present disclosure provides a computer program product including a computer program, where the computer program, when executed by a processor, causes the display control method according to the first aspect and various possible design of the first aspect to be implemented.

The above descriptions are only preferred embodiments of the present disclosure and illustrations of the applied technical principles. Those skilled in the art should understand that the scope involved in the present disclosure is not limited to the technical schemes formed from a specific combination of the above-described technical features, but covers other technical schemes formed from any combination of the above-described technical features or their equivalent features without departing from the above disclosed concept, such as a technical scheme formed from replacement of the above-described features with technical features having similar functionalities to those disclosed in (but not limited to) the present disclosure.

Furthermore, although the operations are depicted in a particular order, this does not mean a requirement that these operations should be performed in the particular order shown or in a sequential order. Under certain circumstances, multitasking and parallel processing may be beneficial. Similarly, although the above discussion contains several specific implementation details, these should not be interpreted as limitations on the scope of the present disclosure. Some features described in the context of separate embodiments also may be implemented in a single embodiment in combination. On the contrary, various features described in the context of a single embodiment also may be implemented in multiple embodiments separately or in any suitable sub-combinations.

Although the subject matters have been described in language specific to structural features and/or methodological logical actions, it will be appreciated that the subject matters defined in the appended claims are not necessarily limited to the specific features or actions described above. On the contrary, the specific features and actions described above are only exemplary forms for implementing the claims.

What is claimed is:

1. A display control method, applied to a head-mounted device comprising a first screen and a second screen, wherein the method comprises:
    determining a parameter mapping relationship corresponding to a target display parameter of the first screen and the second screen, wherein the parameter mapping relationship indicates a conversion relationship between a first parameter value corresponding to the target display parameter of the first screen and a second parameter value corresponding to the target display parameter of the second screen;
    obtaining a target parameter value set for the target display parameter;
    determining, based on the target parameter value and the parameter mapping relationship, the first parameter value corresponding to the first screen and the second parameter value corresponding to the second screen; and
    setting the target display parameter of the first screen as the first parameter value, and setting the target display parameter of the second screen as the second parameter value.

2. The method according to claim 1, wherein the determining, based on the target parameter value and the parameter mapping relationship, the first parameter value corresponding to the first screen and the second parameter value corresponding to the second screen comprises:
    determining a target screen from the first screen and the second screen;
    determining the target parameter value as a first target parameter value corresponding to the target display parameter of the target screen;
    performing, according to the target parameter value and the parameter mapping relationship, parameter calculation on the target display parameter so as to obtain a mapping parameter value;
    determining the mapping parameter value as a second target parameter value of the other screens except the target screen; and
    determining, according to the first target parameter value of the target screen and the second target parameter value of the other screens, the first parameter value corresponding to the first screen and the second parameter value corresponding to the second screen.

3. The method according to claim 2, wherein after the obtaining the target parameter value set for the target display parameter, the method further comprises:
    obtaining a first parameter value range corresponding to the target display parameter of the first screen and a second parameter value range corresponding to the target display parameter of the second screen; and
    obtaining a target setting value of the target display parameter;
    the obtaining the target parameter value set for the target display parameter comprises:
    if it is determined that the target setting value is within both the first parameter value range and the second parameter value range, determining the target setting value as the target parameter value;
    the determining the target screen from the first screen and the second screen comprises:
    determining the target screen randomly from the first screen and the second screen.

4. The method according to claim 3, wherein the obtaining the target parameter value set for the target display parameter comprises:
    if it is detected that the target setting value is within the first parameter value range and not within the second parameter value range, determining the target setting value as the target parameter value;
    the determining the target screen from the first screen and the second screen comprises:
    determining the first screen as the target screen.

5. The method according to claim 3, wherein the obtaining the target parameter value set for the target display parameter comprises:
    if it is detected that the target setting value is not within the first parameter value range and within the second parameter value range, determining the target setting value as the target parameter value;
    the determining the target screen from the first screen and the second screen comprises:
    determining the second screen as the target screen.

6. The method according to claim 5, wherein the obtaining the target parameter value set for the target display parameter comprises:
    if it is determined that the target setting value is neither within the first parameter value range nor within the second parameter value range, determining whether the target setting value is greater than a maximum parameter value in the first parameter value range and the second parameter value range;

if so, obtaining a first maximum value from the first parameter value range and a second maximum value from the second parameter value range; determining a minimum value in the first maximum value and the second maximum value as the target parameter value; and if not, obtaining a first minimum value from the first parameter value range and a second minimum value from the second parameter value range; determining a maximum value in the first minimum value and the second minimum value as the target parameter value;

the determining the target screen from the first screen and the second screen comprises:

determining, based on a parameter value range corresponding to the target parameter value, a screen corresponding to the parameter value range as the target screen.

7. The method according to claim 1, wherein the determining the parameter mapping relationship corresponding to the target display parameter of the first screen and the second screen comprises:

obtaining a first display curve corresponding to the target display parameter of the first screen;

obtaining a second display curve corresponding to the target display parameter of the second screen; and determining, based on a curve difference between the first display curve and the second display curve, the parameter mapping relationship corresponding to the target display parameter of the first screen and the second screen.

8. The method according to claim 7, wherein the head-mounted device further comprises: a first sensor disposed on the first screen, and a second sensor disposed on the second screen; the method further comprises:

obtaining target setting data based on parameter setting processing of the target display parameter; and respectively setting the first screen and the second screen as the target setting data;

the obtaining the first display curve corresponding to the target display parameter of the first screen comprises:

performing, by using a first sensor disposed on the first screen, parameter detection on the target display parameter of the set first screen so as to obtain first detection data; and performing, based on the target setting data and the first detection data, fitting processing on a display curve of the first screen so as to obtain a first display curve;

the obtaining the second display curve corresponding to the target display parameter of the second screen comprises:

performing, by using a second sensor disposed on the second screen, parameter detection on the target display parameter of the set second screen so as to obtain second detection data; and performing, based on the target setting data and the second detection data, fitting processing on a display curve of the second screen so as to obtain a second display curve.

9. The method according to claim 1, wherein the parameter mapping relationship comprises a linear fitting function; and the target display parameter comprises one or more the following parameters: a brightness parameter, a color temperature parameter, a contrast parameter and a refresh rate parameter.

10. The method according to claim 1, wherein the setting the target display parameter of the first screen as the first parameter value, and setting the target display parameter of the second screen as the second parameter value comprises:

generating parameter setting information based on the first parameter value corresponding to the first screen and the second parameter value corresponding to the second screen; and outputting the parameter setting information to the head-mounted device, wherein the parameter setting information instructs the head-mounted device to set the first screen as the first parameter value and set the second screen as the second parameter value.

11. A head-mounted device, comprising: a processor, a memory, a first screen, and a second screen; wherein there are circuit interconnections among the processor, the memory, the first screen, and the second screen;

the memory is configured to store computer execution instructions; and the processor executes the computer execution instructions stored in the memory to cause the processor to be configured to:

determine a parameter mapping relationship corresponding to a target display parameter of the first screen and the second screen, wherein the parameter mapping relationship indicates a conversion relationship between a first parameter value corresponding to the target display parameter of the first screen and a second parameter value corresponding to the target display parameter of the second screen;

obtain a target parameter value set for the target display parameter;

determine, based on the target parameter value and the parameter mapping relationship, the first parameter value corresponding to the first screen and the second parameter value corresponding to the second screen; and set the target display parameter of the first screen as the first parameter value, and set the target display parameter of the second screen as the second parameter value.

12. The head-mounted device according to claim 11, wherein the processor is configured to:

determine a target screen from the first screen and the second screen;

determine the target parameter value as a first target parameter value corresponding to the target display parameter of the target screen;

perform, according to the target parameter value and the parameter mapping relationship, parameter calculation on the target display parameter so as to obtain a mapping parameter value;

determine the mapping parameter value as a second target parameter value of the other screens except the target screen; and determine, according to the first target parameter value of the target screen and the second target parameter value of the other screens, the first parameter value corresponding to the first screen and the second parameter value corresponding to the second screen.

13. The head-mounted device according to claim 12, wherein after obtaining the target parameter value set for the target display parameter, the processor is configured to:

obtain a first parameter value range corresponding to the target display parameter of the first screen and a second parameter value range corresponding to the target display parameter of the second screen; and obtain a target setting value of the target display parameter;

if it is determined that the target setting value is within both the first parameter value range and the second parameter value range, determine the target setting value as the target parameter value;

determine the target screen randomly from the first screen and the second screen.

14. The head-mounted device according to claim 13, wherein the processor is further configured to:

if it is detected that the target setting value is within the first parameter value range and not within the second parameter value range, determine the target setting value as the target parameter value;

determine the first screen as the target screen.

15. The head-mounted device according to claim 11, wherein the head-mounted device further comprises: a first sensor disposed on the first screen and a second sensor disposed on the second screen; there are circuit interconnections among the first sensor, the second sensor, the memory, the processor, the first screen and the second screen;

the processor is configured to respectively set the first screen and the second screen as target setting data;

the first sensor is configured to, when the first screen is set as the target setting data, perform parameter detection on the first screen so as to obtain first detection data;

the second sensor is configured to, when the second screen is set as the target setting data, perform parameter detection on the second screen so as to obtain second detection data;

the processor is further configured to: perform, based on the target setting data and the first detection data, fitting processing on a display curve of the first screen so as to obtain a first display curve; perform, based on the target setting data and the second detection data, fitting processing on a display curve of the second screen so as to obtain a second display curve; and determine, based on a curve difference between the first display curve and the second display curve, the parameter mapping relationship corresponding to the target display parameter of the first screen and the second screen.

16. The head-mounted device according to claim 11, wherein the parameter mapping relationship comprises a linear fitting function; and the target display parameter comprises one or more of the following parameters: a brightness parameter, a color temperature parameter, a contrast parameter and a refresh rate parameter.

17. A non-transitory computer readable storage medium, wherein the computer readable storage medium stores therein computer execution instructions, a process, when executing the computer execution instructions, is configured to:

determine a parameter mapping relationship corresponding to a target display parameter of the first screen and the second screen, wherein the parameter mapping relationship indicates a conversion relationship between a first parameter value corresponding to the target display parameter of the first screen and a second parameter value corresponding to the target display parameter of the second screen;

obtain a target parameter value set for the target display parameter;

determine, based on the target parameter value and the parameter mapping relationship, the first parameter value corresponding to the first screen and the second parameter value corresponding to the second screen; and set the target display parameter of the first screen as the first parameter value, and set the target display parameter of the second screen as the second parameter value.

18. The non-transitory computer readable storage medium according to claim 17, wherein the processor is configured to:

determine a target screen from the first screen and the second screen;

determine the target parameter value as a first target parameter value corresponding to the target display parameter of the target screen;

perform, according to the target parameter value and the parameter mapping relationship, parameter calculation on the target display parameter so as to obtain a mapping parameter value;

determine the mapping parameter value as a second target parameter value of the other screens except the target screen; and determine, according to the first target parameter value of the target screen and the second target parameter value of the other screens, the first parameter value corresponding to the first screen and the second parameter value corresponding to the second screen.

19. The non-transitory computer readable storage medium according to claim 17, the processor is further configured to:

generate parameter setting information based on the first parameter value corresponding to the first screen and the second parameter value corresponding to the second screen; and output the parameter setting information to the head-mounted device, wherein the parameter setting information instructs the head-mounted device to set the first screen as the first parameter value and set the second screen as the second parameter value.

20. The non-transitory computer readable storage medium according to claim 17, wherein the parameter mapping relationship comprises a linear fitting function; and the target display parameter comprises one or more of the following parameters: a brightness parameter, a color temperature parameter, a contrast parameter and a refresh rate parameter.

* * * * *